(12) United States Patent
Mori

(10) Patent No.: US 8,858,256 B2
(45) Date of Patent: Oct. 14, 2014

(54) CONNECTOR FIXING STRUCTURE

(75) Inventor: Shigeo Mori, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/594,276

(22) Filed: Aug. 24, 2012

(65) Prior Publication Data

US 2012/0322302 A1    Dec. 20, 2012

Related U.S. Application Data

(63) Continuation of application No. PCT/JP2011/078487, filed on Dec. 8, 2011.

(30) Foreign Application Priority Data

Dec. 20, 2010    (JP) ................. 2010-283314

(51) Int. Cl.
   *H01R 13/73*    (2006.01)
   *B60L 11/18*    (2006.01)
   *H01R 13/74*    (2006.01)
   *B60K 15/05*    (2006.01)

(52) U.S. Cl.
   CPC ............ *H01R 13/74* (2013.01); *B60L 11/1818* (2013.01); *Y02T 10/7005* (2013.01); *Y02T 10/7088* (2013.01); *Y02T 90/14* (2013.01); *H01R 2201/26* (2013.01); *B60K 2015/053* (2013.01); *Y02T 90/121* (2013.01)
   USPC ............................ 439/573; 439/564; 439/565

(58) Field of Classification Search
   USPC .......................................... 439/564–565, 573
   See application file for complete search history.

(56) References Cited

U.S. PATENT DOCUMENTS

| 5,417,579 A | 5/1995 | Yoshioka et al. |
| 5,873,737 A * | 2/1999 | Hashizawa et al. ............. 439/39 |
| 6,371,768 B1 * | 4/2002 | Neblett et al. .................. 439/34 |
| 6,984,148 B1 | 1/2006 | Nanda et al. |
| 7,044,782 B2 | 5/2006 | Enami et al. |
| 7,972,154 B2 * | 7/2011 | Pech et al. .................... 439/173 |

(Continued)

FOREIGN PATENT DOCUMENTS

| DE | 44 32 194 A1 | 4/1995 |
| JP | 2752032 B2 | 2/1998 |
| JP | 2006-73207 A | 3/2006 |

OTHER PUBLICATIONS

International Search Report (PCT/ISA/210) dated Feb. 28, 2012, issued by the International Searching Authority in corresponding International Application No. PCT/JP2011/078487.

(Continued)

*Primary Examiner* — Renee Luebke
*Assistant Examiner* — Larisa Tsukerman
(74) *Attorney, Agent, or Firm* — Sughrue Mion, PLLC

(57) ABSTRACT

In an inner peripheral surface of metal collar fixed to a flange part of a power receiving side connector, a female screw is formed. When the flange part is attached to a connector attaching part from the outer surface side of a vehicle body, the flange part is fastened to the connector attaching part by a first male screw member inserted into the metal collar and a nut screwed to the first male screw member. When the flange part is attached to the connector attaching part from the inner surface side of the vehicle body, the flange part is fastened to the connector attaching part by a second male screw member screwed to the metal collar.

1 Claim, 9 Drawing Sheets

(56) References Cited

U.S. PATENT DOCUMENTS

| | | | |
|---|---|---|---|
| 8,075,329 B1* | 12/2011 | Janarthanam et al. | 439/304 |
| 8,376,767 B2* | 2/2013 | Kahara et al. | 439/304 |
| 8,376,768 B2* | 2/2013 | Kurumizawa et al. | 439/304 |
| 2006/0014421 A1* | 1/2006 | Nanda et al. | 439/564 |
| 2006/0046563 A1 | 3/2006 | Enami et al. | |
| 2006/0199429 A1* | 9/2006 | Chang et al. | 439/564 |
| 2011/0223792 A1* | 9/2011 | Osawa et al. | 439/345 |

OTHER PUBLICATIONS

Written Opinion (PCT/ISA/237) of the International Searching Authority, dated Feb. 28, 2012, issued in corresponding International Application No. PCT/JP2011/078487.

Extended European Search Report dated Apr. 28, 2014, issued by the European Patent Office in counterpart European Application No. 11850272.3.

Office Action issued in corresponding Chinese Patent Application No. 201180018375.5 on Jun. 18, 2014.

* cited by examiner

CONNECTOR FIXING STRUCTURE

CROSS REFERENCE TO RELATED APPLICATION

This application is a continuation of PCT application No. PCT/JP2011/078487, which was filed on Dec. 8, 2011 based on Japanese Patent Application (No. 2010-283314) filed on Dec. 20, 2010, the contents of which are incorporated herein by reference. Also, all the references cited herein are incorporated as a whole.

BACKGROUND OF THE INVENTION

1. Technical Field

The present invention relates to a connector fixing structure of a power receiving side connector to be attached to a vehicle body as a feeder connector used for charging a battery in an electric vehicle.

2. Background Art

FIG. 7 and FIG. 8 show a usual example of a feeder connector used for charging a battery in an electric vehicle.

The feeder connector 1 is disclosed in Japanese Patent No. 2752032 and includes a feeder side connector 3 connected to a feeder device not shown in the drawing and a power receiving side connector 5 attached to a connector attaching part 4 of a vehicle body of the electric vehicle so as to be fitted and connected by the feeder side connector 3.

The connector attaching part 4 includes an electric wire insertion opening 41 for inserting an electric wire, or the like, extended from a back surface of the power receiving side connector 5 and screw insertion holes 42 which are formed in the periphery of the electric wire insertion opening 41 to screw the power receiving side connector 5.

The power receiving side connector 5 includes an outer tube wall part 51 of a tubular structure having a diameter smaller than that of the electric wire insertion opening 41, an opening and closing cap 52, a flange part 53 and metal collars 54.

The outer tube wall part 51 is a tubular part having an inner periphery to which a front side tube part 3a of a tubular housing of the feeder side connector 3 is fitted and connected. As shown in FIG. 8, power supply terminal accommodating tube parts 57 which accommodate and hold power supply terminals and signal terminal accommodating tube parts 58 which accommodate and hold terminals for signals are provided inside the outer tube wall part 51.

The opening and closing cap 52 is a substantially circular cover member which covers an opening 51a of the outer tube wall part 51 so as to be opened and closed. As shown in FIG. 7 and FIG. 8, the opening and closing cap 52 is provided with an engaging part 52a in one side of an outer periphery. Further, the other side of the outer periphery opposed to the engaging part 52a is connected to the outer tube wall part 51 by a hinge mechanism 59 so as to freely rotate.

The opening and closing cap 52 rotates by the hinge mechanism 59 to open and close the opening 51a. Under a state that the opening and closing cap 52 closes the opening 51a, a cap engaging piece 61 formed in a separate member and fixed to an outer periphery of the outer tube wall part 51 is engaged with the engaging part 52a. Thus, the opening and closing cap 52 is fixed to close the opening 51a.

The flange part 53 is formed to protrude in the form of a collar in the outer periphery of the outer tube wall part 51. The flange part 53 is overlapped on a peripheral edge part of the electric wire insertion opening 41 of the connector attaching part 4.

The metal collars 54 are tubular members into which screw members can be inserted and fixed to positions on the flange part 53 corresponding to the screw insertion holes 42. The metal collars 54 are, for instance, pressed-in to lower holes passing through the flange part 53 to be fixed to the flange part 53. The metal collars 54 may be not only pressed-in and fixed to the flange part 53, but also insert-molded integrally with the flange part 53 during a formation of the flange part 53.

In an ordinary case, as shown in FIG. 7, the flange part 53 is overlapped on the connector attaching part 4 from an outer surface side of the vehicle body so that the above-described power receiving side connector 5 is fastened and fixed to the connector attaching part 4 by male screw members 63 and nuts 64.

When the flange part 53 is overlapped on the connector attaching part 4, an operation is previously carried out that the electric wire extended from the back surface of the power receiving side connector 5 is inserted into the electric wire insertion opening 41.

The size of a terminal connector connected to the electric wire extended from the back surface of the power receiving side connector 5 changes depending on the standard of a feeder part mounted on the vehicle. Some of the electric wires are too large to be inserted into the electric wire insertion opening 41.

The electric wire to which such a large terminal connector is connected cannot be inserted into the electric wire insertion opening 41. Accordingly, in the case of the power receiving side connector 5 having the large terminal connector is connected to the end of the electric wire, the power receiving side connector 5 is attached to the connector attaching part 4 from an inner surface side of the vehicle body. In this case, usually, a bracket 21 is attached to the power receiving side connector 5 and the power receiving side connector 5 is attached to the connector attaching part 4 through the bracket 21 as shown in FIG. 9 and FIG. 10.

SUMMARY OF THE INVENTION

However, when the power receiving side connector 5 is attached to the connector attaching part 4 from the inner surface side of the vehicle body, since the bracket 21 as a separate component should be prepared in the usual connector fixing structure using the bracket 21 as shown in FIG. 9 and FIG. 10, a problem arises that not only a cost is increased, but also working processes are increased to deteriorate a workability in attaching.

Thus, it is an object of the present invention to solve the above-described problems and provide a connector fixing structure in which a power receiving side connector ordinarily attached to a connector attaching part of a vehicle body from an outer surface side of the vehicle body can be completely and simply attached without using a special component such as a bracket even when the power receiving side connector is attached to the connector attaching part from an inner surface side of the vehicle body An aspect of the present invention provides below-described configurations.

(1) A connector fixing structure which fastens and connects a power receiving side connector to which a feeder side connector can be fitted and connected to a connector attaching part of a vehicle body of an electric vehicle by a screw part, wherein the connector attaching part includes an electric wire insertion opening for inserting an electric wire extended from a back surface of the power receiving side connector and a screw insertion hole formed in the periphery of the electric wire insertion opening to screw the power receiving side connector, the power receiving side connector includes an outer tube wall part formed in a tubular structure which has a diameter smaller than that of the electric wire insertion opening and to which a front side tube part of a tubular housing of the feeder side connector is fitted and connected, a flange part protruding in an outer periphery of the outer tube wall part and overlapped on a peripheral edge part of the electric wire insertion opening and a metal collar as a tubular member fixed to a position of the flange part corresponding to the screw insertion hole so as to insert a screw member, a female screw which is provided in an inner peripheral surface of the metal collar and to which a male screw inserted into the screw insertion hole can be screwed, when the flange part is attached to the connector attaching part from an outer surface side of the vehicle body, a first male screw member whose screw diameter is smaller than that of the female screw is inserted into the metal collar and the screw insertion hole from the outer surface side of the vehicle body and a nut is screwed to the first male screw member inserted into the screw insertion hole to fix the power receiving side connector to the connector attaching part, and when the flange part is attached to the connector attaching part from an inner surface side of the vehicle body, a second male screw member having a male screw part screwed to the female screw part is inserted into the screw insertion hole from the outer surface side of the vehicle body and screwed to the female screw of the metal collar to fix the power receiving side connector to the connector attaching part.

The configuration (1) may be modified to (2) The connector fixing structure according to the configuration (1), wherein a temporarily engaging protrusion is provided in the outer tube wall part, the temporarily engaging protrusion being engaged with the electric wire insertion opening when the outer tube wall part is inserted into the electric wire insertion opening to temporarily attach the power receiving side connector to the connector attaching part.

According to the configuration (1), when the flange part is attached to the connector attaching part from the outer surface side of the vehicle body, the power receiving side connector can be simply fixed to the connector attaching part by a standard fastening operation using the first male screw member whose screw diameter is smaller than that of the female screw of the metal collar and the nut.

On the other hand, when the flange part is attached to the connector attaching part from the inner surface side of the vehicle body, the power receiving side connector can be fixed to the connector attaching part only by the second male screw member having the male screw part screwed to the female screws part of the metal collar. Thus, an attaching operation is more easily carried out.

Namely, even when the power receiving side connector which is attached to the connector attaching part of the vehicle body ordinarily from the outer surface side of the vehicle body is attached to the connector attaching part from the inner surface side of the vehicle body, the power receiving side connector can be completely and simply attached to the connector attaching part without using a special component such as a bracket. Thus, a cost can be reduced and workability can be improved.

Further, according to the configuration (2), when the flange part is attached to the connector attaching part from the inner surface side of the vehicle body the outer tube wall part protruding in a front surface side of the power receiving side connector is inserted into the electric wire insertion opening from the back surface side of the connector attaching part. Thus, the temporarily engaging protrusion is engaged with the electric wire insertion opening to temporarily fix the power receiving side connector to the connector attaching part. Therefore, when the power receiving side connector is fastened by the screw, even if the power receiving side connector is not supported from the back surface side of the connector attaching part, the power receiving side connector can be prevented from slipping out. Thus, a fastening operation of the power receiving side connector is made to be easier.

DETAILED DESCRIPTION OF THE EXEMPLARY EMBODIMENTS

Figure 1:
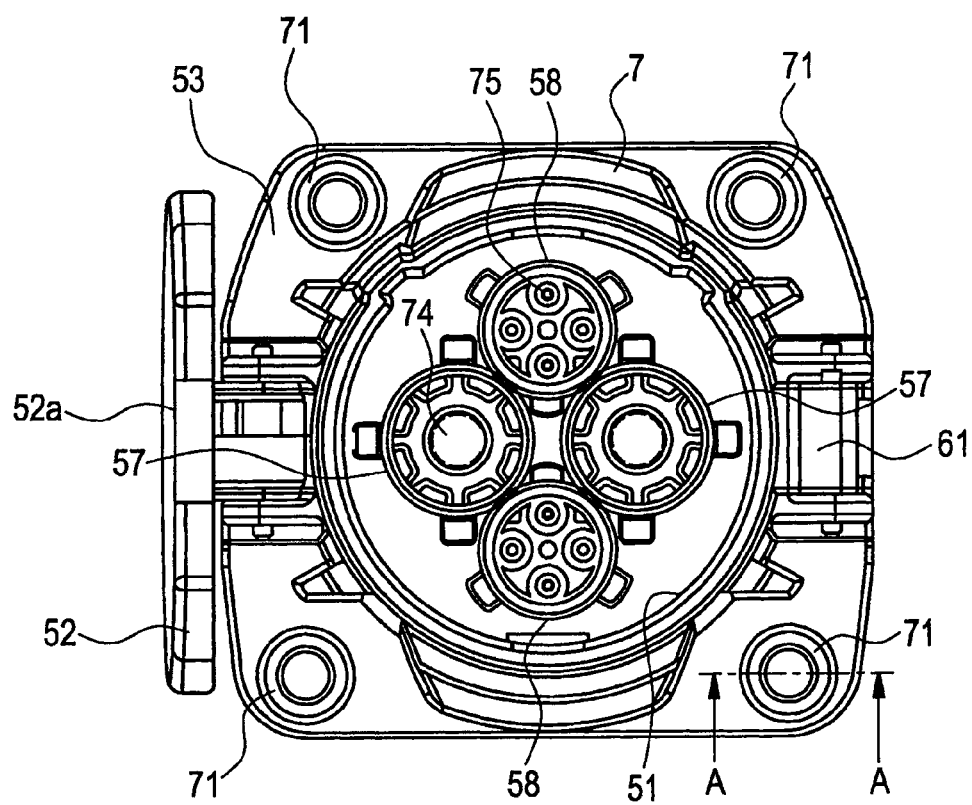
FIG. 1 is a front view of one exemplary embodiment of a power receiving side connector of a connector fixing structure according to the present invention.

Now, an exemplary embodiment of a power receiving side connector and a connector fixing structure according to the present invention will be described below in detail by referring to the drawings.

Figure 2:
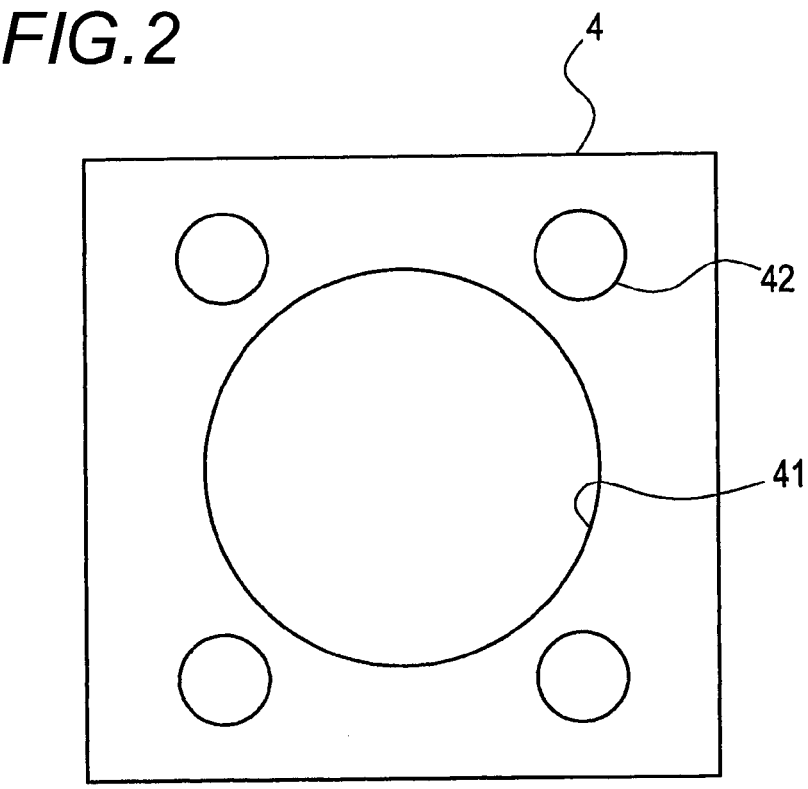
FIG. 2 is a front view of a connector attaching part of a vehicle body to which the power receiving side connector shown in FIG. 1 is attached.
Figure 3:
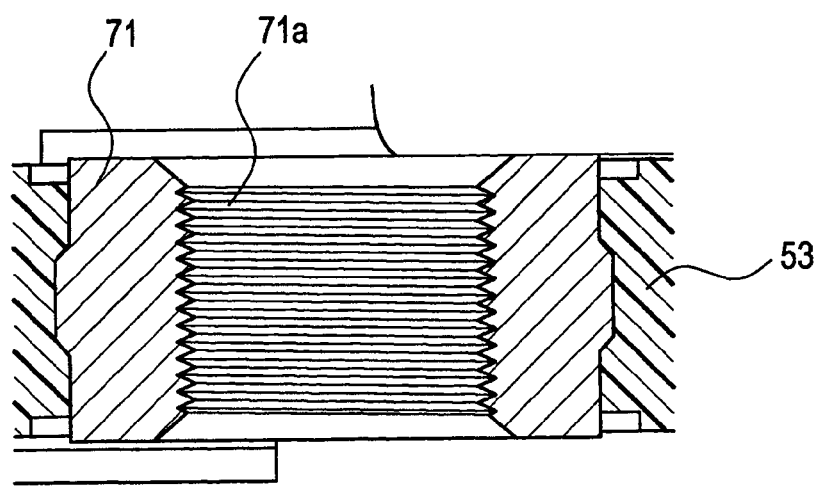
FIG. 3 is a sectional view taken along a line A-A in FIG. 1.
Figure 4:
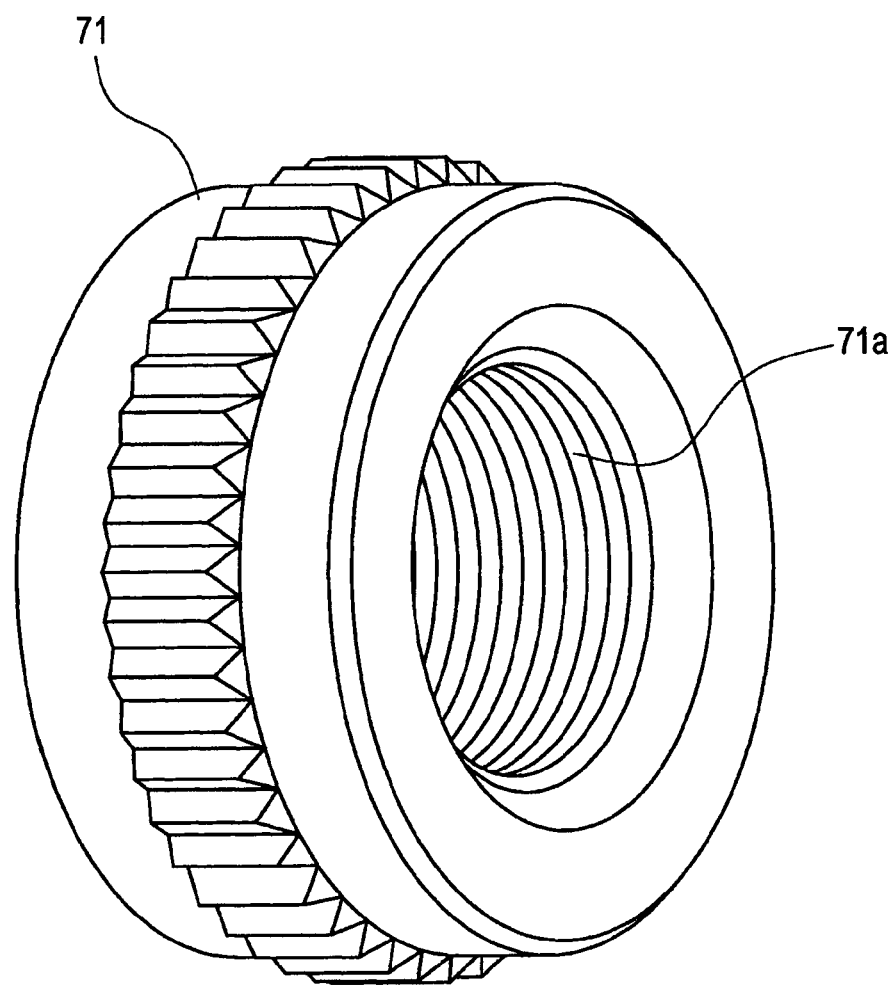
FIG. 4 is a perspective view of a metal collar shown in FIG. 3.

FIG. 1 to FIG. 4 show one exemplary embodiment of a power receiving side connector of a connector fixing structure according to the present invention. FIG. 1 is a front view of the one exemplary embodiment of the power receiving side connector of the connector fixing structure according to the present invention. FIG. 2 is a front view of a connector attaching part of a vehicle body to which the power receiving side connector shown in FIG. 1 is attached. FIG. 3 is a sectional view taken along a line A-A in FIG. 1. FIG. 4 is a perspective view of a metal collar shown in FIG. 3.

Figure 7:
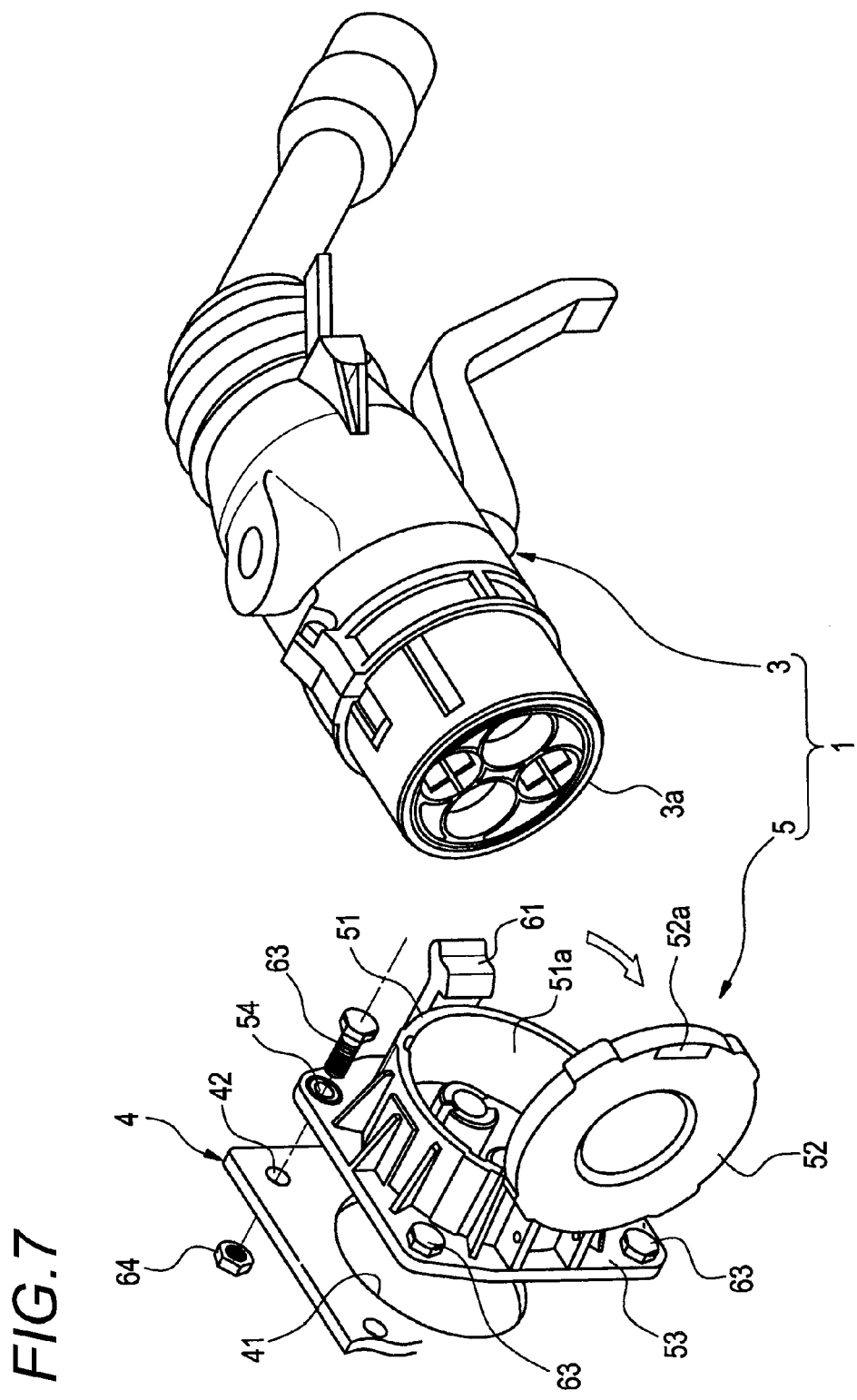
FIG. 7 is an explanatory diagram of an ordinary fixing structure of a usual power receiving side connector.
Figure 8:
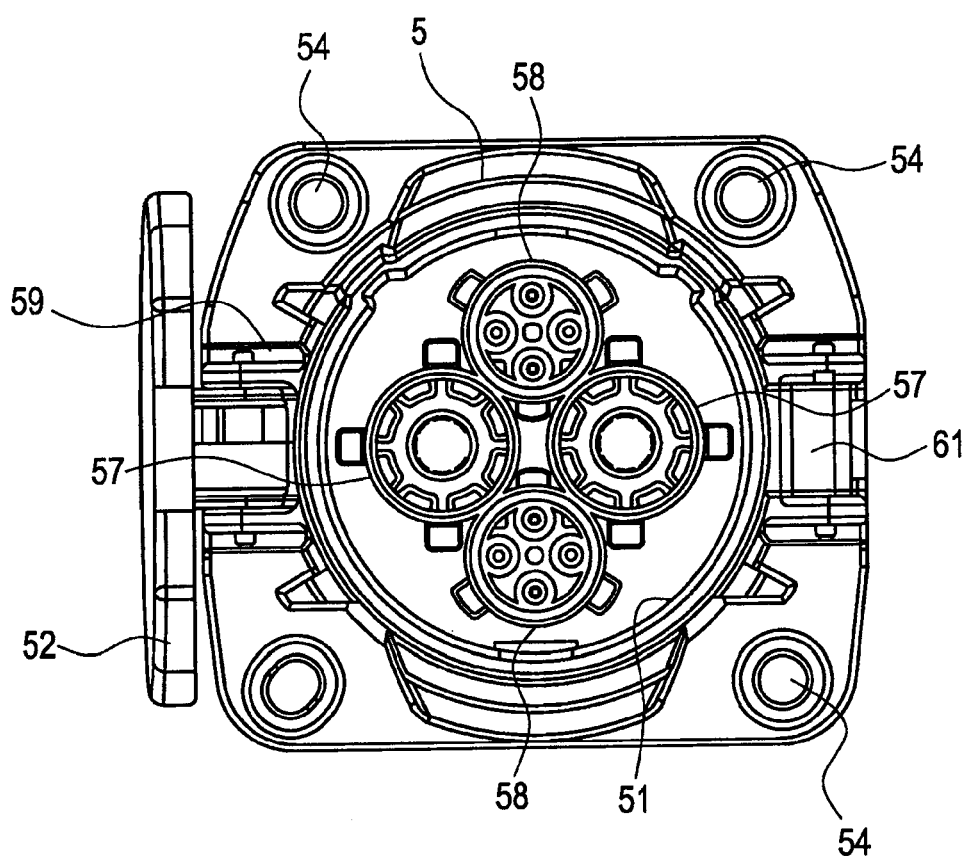
FIG. 8 is a front view of the power receiving side connector shown in FIG. 7.
Figure 9:
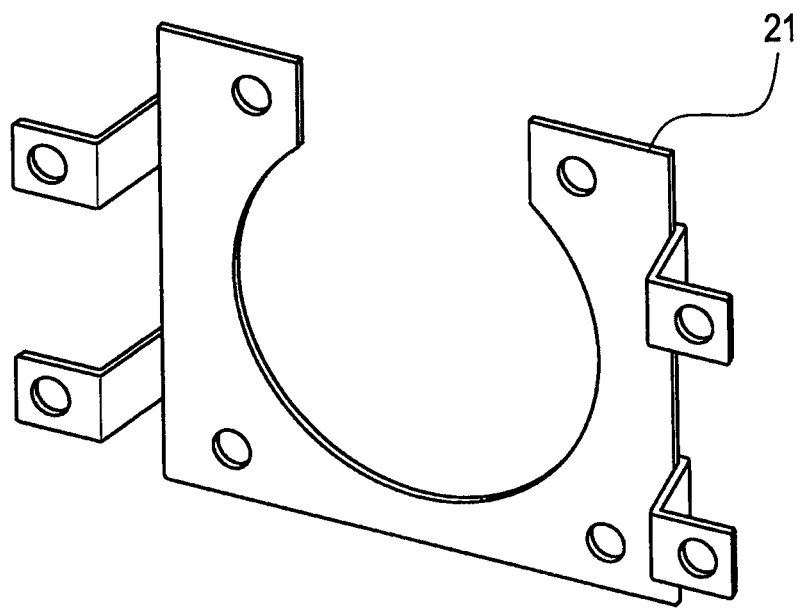
FIG. 9 is a perspective view of a bracket used when the usual power receiving side connector is attached to a back surface of a connector attaching part.
Figure 10:
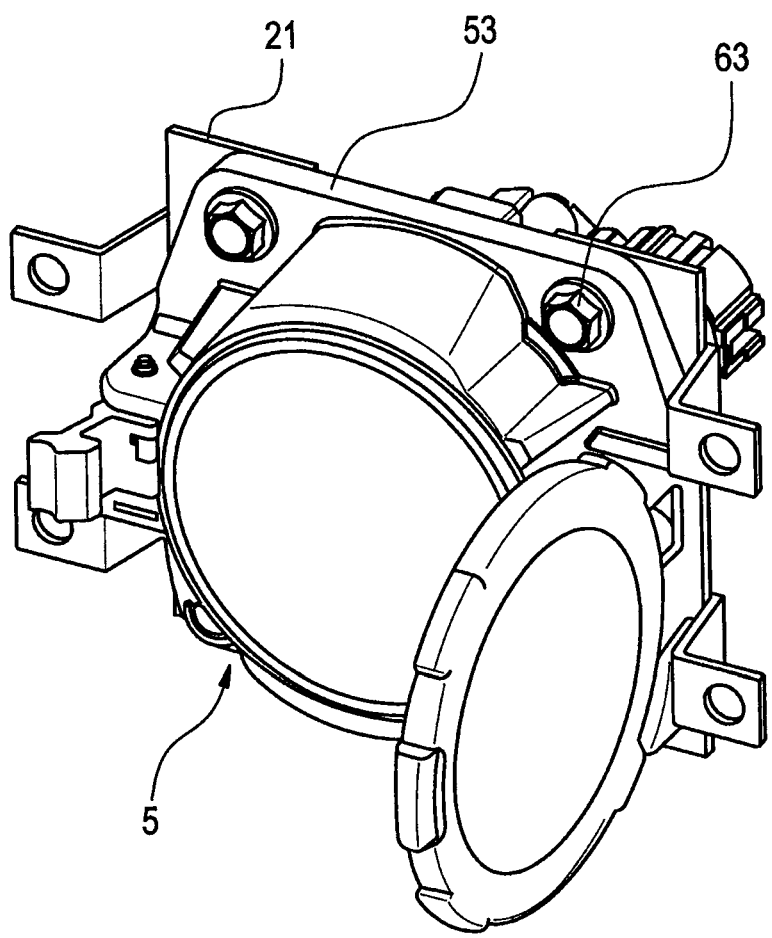
FIG. 10 is a perspective view of the power receiving side connector to which the bracket shown in FIG. 9 is attached.

A power receiving side connector 7 of the one exemplary embodiment partly improves the power receiving side connector 5 shown in FIG. 7 and is attached to a connector attaching part 4 of a vehicle body of an electric vehicle so that a feeder side connector 3 connected to a feeder device may be fitted and connected thereto.

The connector attaching part 4 includes, as shown in FIG. 2, an electric wire insertion opening 41 for inserting an electric wire extended from a back surface of the power receiving side connector 7 and screw insertion holes 42 which are formed in the periphery of the electric wire insertion opening 41 to screw the power receiving side connector 7.

The power receiving side connector 7 includes an outer tube wall part 51 of a tubular structure having a diameter smaller than that of the electric wire insertion opening 41, an opening and closing cap 52, a flange part 53, metal collars 71 and a temporarily engaging protrusion.

In the power receiving side connector 7 of the present exemplary embodiment, other structures than the metal collars 71 and the temporarily engaging protrusion may be the same as corresponding structures of the power receiving side connector 5 shown in FIG. 7. The same structures as those of the power receiving side connector 5 are designated by the same reference numerals and an explanation thereof will be omitted.

In FIG. 1, reference numeral 74 designates a power supply terminal held in a power supply terminal accommodating tube part 57. Reference numeral 75 designates a signal terminal held in a signal terminal accommodating tube part 58.

The metal collars 71 in the power receiving side connector 7 of the present exemplary embodiment are tubular members into which screw members can be inserted and fixed to positions on the flange part 53 corresponding to the screw insertion holes 42 of the connector attaching part 4. The metal collars 71 are, for instance, pressed-in to lower holes passing through the flange part 53 to be fixed to the flange part 53. The metal collars 71 are not formed in simple tubular shapes, but have, as shown in FIG. 3 and FIG. 4, female screws 71a in their inner peripheral surfaces to which male screws inserted into the screw insertion holes 42 can be screwed.

The above-described temporarily engaging protrusion is a protruding member which is provided in an outer periphery of the outer tube wall part 51 and engaged with the electric wire insertion opening 41 when the outer tube wall part 51 is inserted into the electric wire insertion opening 41 to temporarily attach the power receiving side connector 7 to the connector attaching part 4.

Now, the connector fixing structure that fixes the above-described power receiving side connector 7 to the connector attaching part 4 will be described below by referring to FIG. 5 and FIG. 6.

Figure 5:
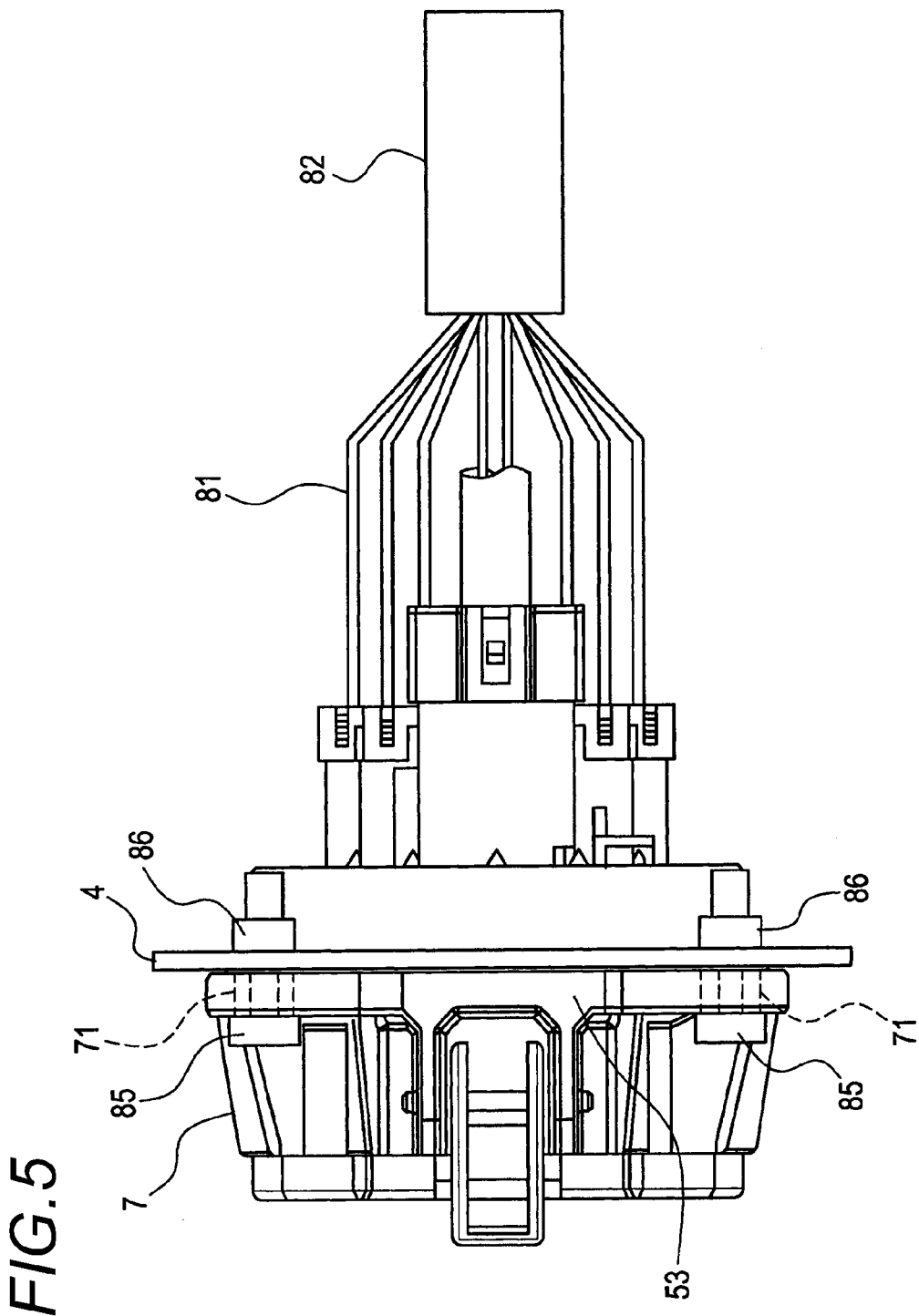
FIG. 5 is an explanatory diagram of the connector fixing structure when an outside diameter of a terminal connector of an end of an electric wire extended to a back surface of the power receiving side connector of the one exemplary embodiment is smaller than an electric wire insertion opening of the connector attaching part.

FIG. 5 is an explanatory diagram of the connector fixing structure when an outside diameter of a terminal connector 82 of an end of an electric wire 81 extended to a back surface of the power receiving side connector 7 of the one exemplary embodiment is smaller than the electric wire insertion opening 41 of the connector attaching part 4.

In this case, the electric wire 81 and the terminal connector 82 in the back surface of the power receiving side connector 7 are inserted into the electric wire insertion opening 41 of the connector attaching part 4 from an outer surface side of the vehicle body and the flange part 53 is overlapped on the connector attaching part 4 from the outer surface side of the vehicle body Then, first male screw members 85 whose screw diameters are smaller than those of the female screws 71a of the metal collars 71 are inserted into the metal collars 71 and the screw insertion holes 42 of the connector attaching part 4 from the outer surface side of the vehicle body. Further, nuts 86 are screwed to the first male screw members 85 inserted into the screw insertion holes 42 to fix the power receiving side connector 7 to the connector attaching part 4.

Figure 6:
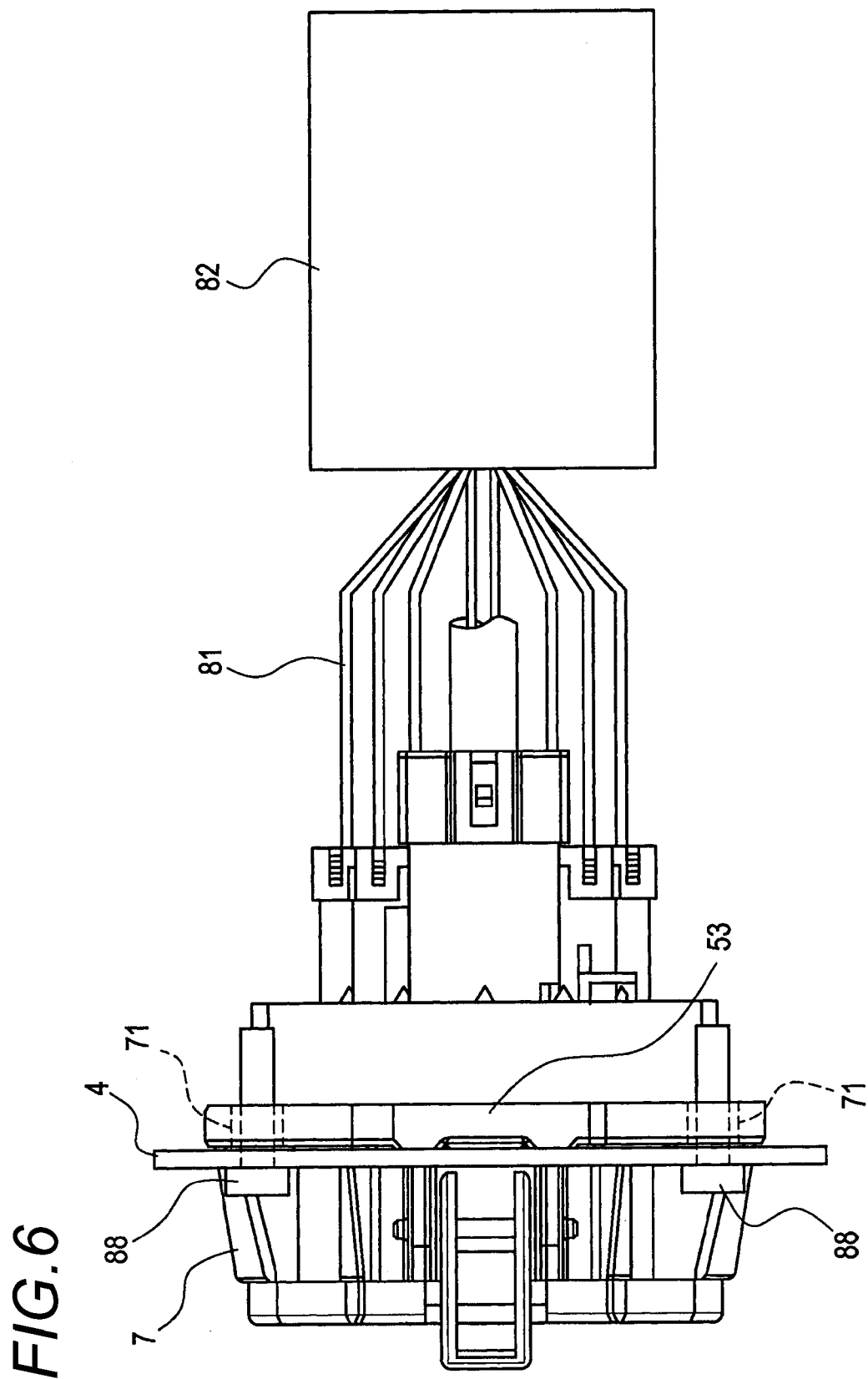
FIG. 6 is an explanatory diagram of the connector fixing structure when the outside diameter of the terminal connector of the end of the electric wire extended to the back surface of the power receiving side connector of the one exemplary embodiment is larger than the electric wire insertion opening of the connector attaching part.

FIG. 6 is an explanatory diagram of the connector fixing structure when the outside diameter of the terminal connector 82 of the end of the electric wire 81 extended to the back surface of the power receiving side connector 7 of the one exemplary embodiment is larger than the electric wire insertion opening 41 of the connector attaching part 4.

In this case, the terminal connector 82 cannot be inserted into the electric wire insertion opening 41 of the connector attaching part 4. Accordingly, the outer tube wall part 51 of the power receiving side connector 7 is inserted into the electric wire insertion opening 41 of the connector attaching part 4 from an inner surface side of the vehicle body the flange part 53 is overlapped on the connector attaching part 4 from the inner surface side of the vehicle body. When the outer tube wall part 51 is inserted into the electric wire insertion opening 41, the temporarily engaging protrusion is engaged with the electric wire insertion opening 41 to temporarily fix the power receiving side connector 7 to the connector attaching part 4.

Then, second male screw members 88 having male screw parts screwed to the female screws 71a are inserted into the screw insertion holes 42 of the connector attaching part 4 from the outer surface side of the vehicle body and screwed to the female screws 71a of the metal collars 71 to fix the power receiving side connector 7 to the connector attaching part 4.

In the power receiving side connector 7 of the above-described one exemplary embodiment, when the flange part 53 is attached to the connector attaching part 4 from the outer surface side of the vehicle body, as shown in FIG. 5, the power receiving side connector 7 can be simply fixed to the connector attaching part 4 by a standard fastening operation using the first male screw members 85 whose screw diameters are smaller than those of the female screws 71a of the metal collars 71 and the nuts 86.

On the other hand, when the flange part 53 is attached to the connector attaching part 4 from the inner surface side of the vehicle body, as shown in FIG. 6, the power receiving side connector 7 can be fixed to the connector attaching part 4 only by the second male screw members 88 having the male screw parts screwed to the female screws 71a of the metal collars 71. Thus, an attaching operation is more easily carried out.

Namely, even when the power receiving side connector 7 which is ordinarily attached to the connector attaching part 4 of the vehicle body from the outer surface side of the vehicle body is attached to the connector attaching part 4 from the inner surface side of the vehicle body, the power receiving side connector 7 can be completely and simply attached to the connector attaching part 4 without using a special component such as a bracket. Thus, a cost can be reduced and workability can be improved.

Further, in the power receiving side connector 7 of the above-described one exemplary embodiment, when the flange part 53 is attached to the connector attaching part 4 from the inner surface side of the vehicle body, the outer tube wall part 51 protruding in a front surface side of the power receiving side connector 7 is inserted into the electric wire insertion opening 41 from the back surface side of the connector attaching part 4, the temporarily engaging protrusion is engaged with the electric wire insertion opening 41 to temporarily fix the power receiving side connector 7 to the connector attaching part 4. Therefore, when the power receiving side connector 7 is fastened by the screws, even if the power receiving side connector 7 is not supported from the back surface side of the connector attaching part 4, the power receiving side connector 7 can be prevented from slipping out. Thus, a fastening operation of the power receiving side connector 7 is made to be easier.

Specific structures of parts of the power receiving side connector 7 fixed by the connector fixing structure of the present invention are not respectively limited to the above-described exemplary embodiment and may be suitably modified and improved.

The present invention is not limited to the above-described exemplary embodiment and may be suitably modified and improved. In addition thereto, materials, forms, dimensions, numeric values, modes, numbers, arranged positions, etc. of component elements in the above-described exemplary embodiment, which can respectively achieve the present invention, may be arbitrarily employed and are not limited.

The present invention is described in detail by referring the specific exemplary embodiment, however, it is to be understood to a person with ordinary skill in the art that various changes or modification may be made without departing from the spirit and scope of the present invention.

According to the power receiving side connector of the present invention, the power receiving side connector which is ordinarily attached to the connector attaching part of the vehicle body from the outer surface side of the vehicle body can be completely and simply attached without using a special parts such as a bracket even when the power receiving side connector is attached to the connector attaching part from the inner surface side of the vehicle body. Thus, the cost can be reduced and the workability can be improved.

What is claimed is:

1. A connector fixing structure which fastens and connects a power receiving side connector to which a feeder side connector can be fitted and connected to a connector attaching part of a vehicle body of an electric vehicle by a screw part, wherein the connector attaching part includes an electric wire insertion opening for inserting an electric wire extended from a back surface of the power receiving side connector and a screw insertion hole formed in the periphery of the electric wire insertion opening to screw the power receiving side connector, the power receiving side connector includes an outer tube wall part formed in a tubular structure which has a diameter smaller than that of the electric wire insertion opening and to which a front side tube part of a tubular housing of the feeder side connector is fitted and connected, a flange part protruding in an outer periphery of the outer tube wall part and overlapped on a peripheral edge part of the electric wire insertion opening and a metal collar as a tubular member fixed to a position of the flange part corresponding to the screw insertion hole so as to insert a screw member, a female screw which is provided in an inner peripheral surface of the metal collar and to which a male screw inserted into the screw insertion hole can be screwed, when the flange part is attached to the connector attaching part from an outer surface side of the vehicle body, a first male screw member whose screw diameter is smaller than that of the female screw is inserted into the metal collar and the screw insertion hole from the outer surface side of the vehicle body and a nut is screwed to the first male screw member inserted into the screw insertion hole to fix the power receiving side connector to the connector attaching part, and when the flange part is attached to the connector attaching part from an inner surface side of the vehicle body, a second male screw member having a male screw part screwed to the female screw part is inserted into the screw insertion hole from the outer surface side of the vehicle body and screwed to the female screw of the metal collar to fix the power receiving side connector to the connector attaching part.

* * * * *